(No Model.) 2 Sheets—Sheet 1.
L. L. SAGENDORPH.
APPARATUS FOR THE MANUFACTURE OF FLEXIBLE ROOFING.
No. 304,457. Patented Sept. 2, 1884.
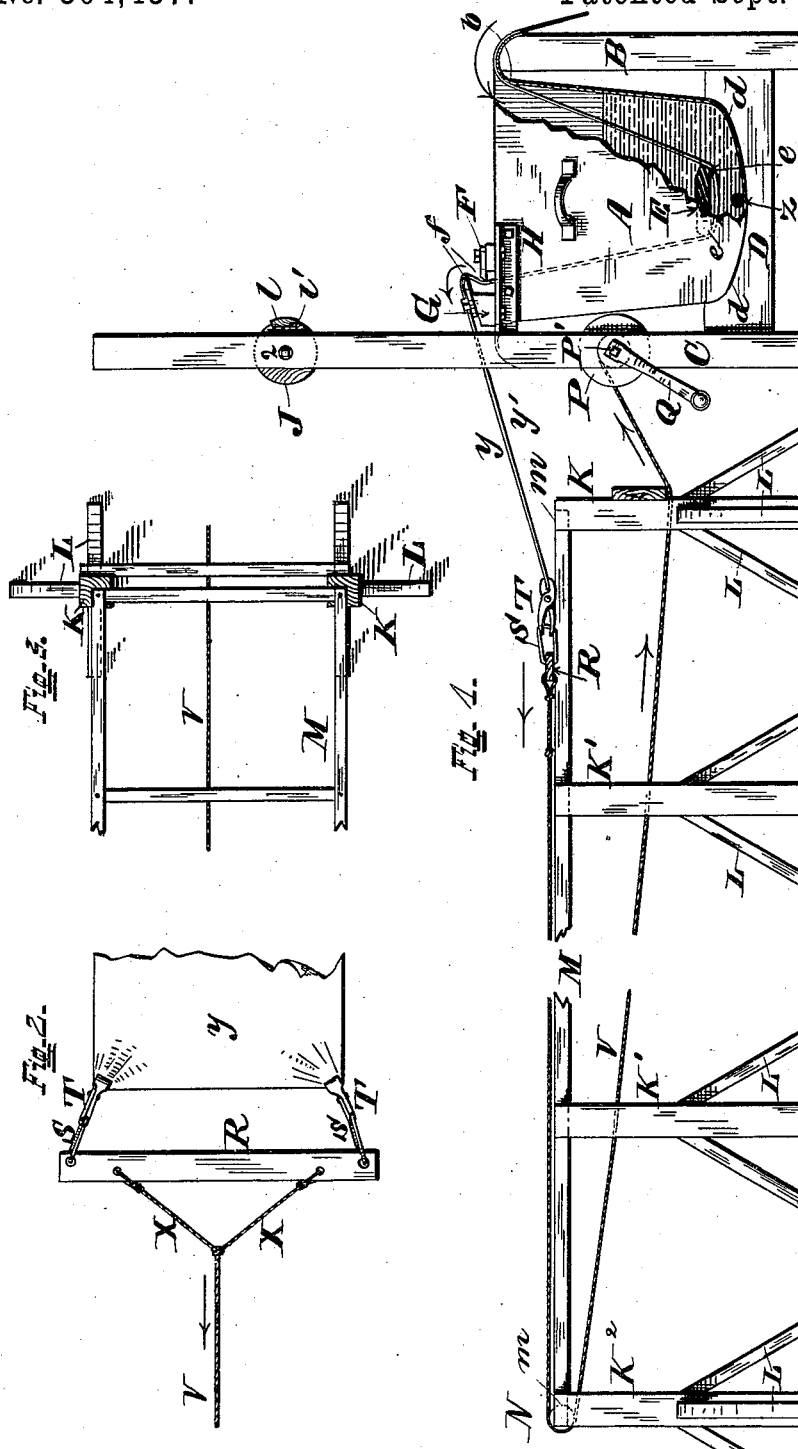

(No Model.) 2 Sheets—Sheet 2.
L. L. SAGENDORPH.
APPARATUS FOR THE MANUFACTURE OF FLEXIBLE ROOFING.
No. 304,457. Patented Sept. 2, 1884.
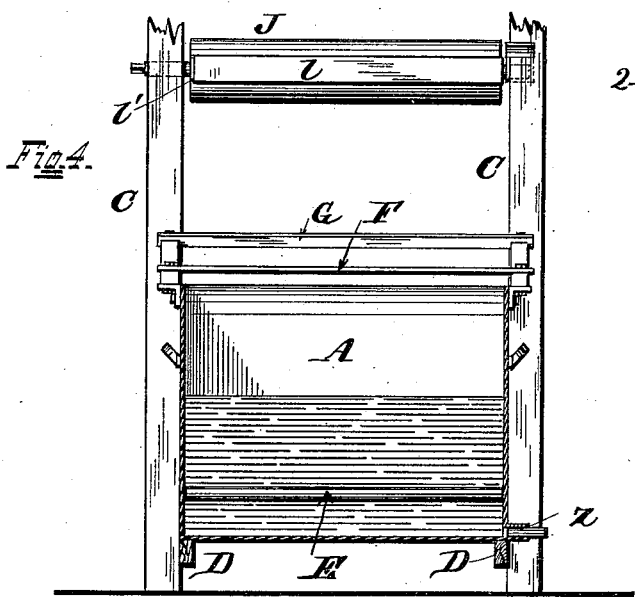
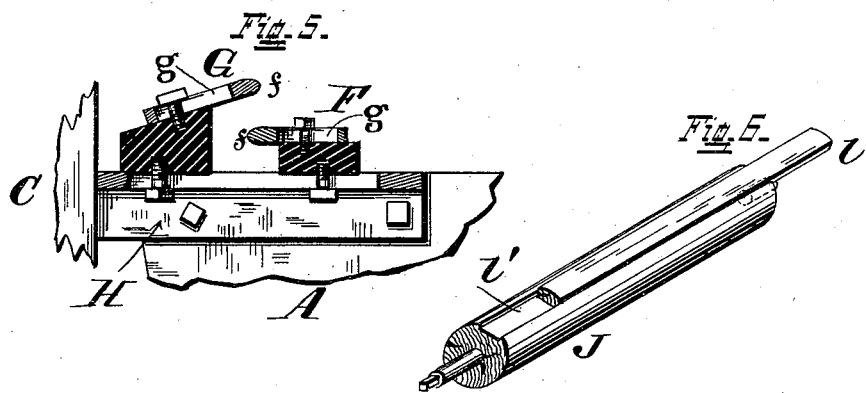
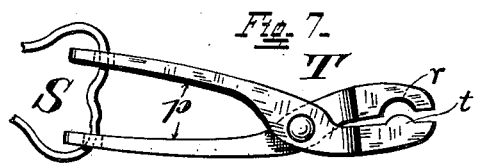
Attest
Malcolm E Williams
O. M. Hill
Inventor
L. Lewis Sagendorph
by Wm. Hubbell Fisher, Atty.

UNITED STATES PATENT OFFICE.

L. LEWIS SAGENDORPH, OF CINCINNATI, OHIO, ASSIGNOR OF ONE-HALF TO H. P. LLOYD, OF SAME PLACE.

APPARATUS FOR THE MANUFACTURE OF FLEXIBLE ROOFING.

SPECIFICATION forming part of Letters Patent No. 304,457, dated September 2, 1884.

Application filed May 27, 1884. (No model.)

*To all whom it may concern:*

Be it known that I, L. LEWIS SAGENDORPH, a resident of the city of Cincinnati, in the county of Hamilton and State of Ohio, have invented certain new and useful Improvements in Apparatus for the Manufacture of Flexible Roofing, of which the following is a specification.

The several features of my invention and the various advantages resulting from their use, conjointly or otherwise, will be apparent from the following description and claims.

In the accompanying drawings, Figure 1 represents a side elevation of an apparatus illustrating my invention, a part of the sides of the tank or receptacle for holding the roofing composition being broken away. Fig. 2 shows one end of the flexible material attached to the grippers and their bar R. Fig. 3 represents a top view of a part of the frame. Fig. 4 represents a cross-section at right angles to the length of the rack, and looking toward that end of the tank which is at the left hand in Fig. 1, and in a detached view of the right of said figure is shown the preferred form of bearing for the journal of the roller upon which the dried coated flexible material is to be wound. Fig. 5 represents a cross-section through a rear upper part of the tank-frame and upper scrapers, the section being taken at a plane parallel to the length of the rack. Fig. 6 is a perspective view of the roller upon which the finished flexible coated material is to be wound, showing its sliding stick or bar partially withdrawn. Fig. 7 is a side view of one of the grippers.

A indicates a tank, whose upper front end, $b$, is rounded on the inner edge. This tank is of suitable inward configuration. Preferably the lower corners, $d$ $d$, are rounded, as shown, and the tank is somewhat smaller from front to rear at and near its bottom than at or near its top. The tank is suitably supported, preferably upon front uprights, B B, and rear uprights, C C, and cross-pieces D, connecting the uprights together. The tank is preferably provided with a waste-opening, $z$, placed in the lowest portion of the tank, and stopped by a suitable plug or other device, whereby a discharge of the contents of the tank can be controlled at will. Centrally in the lower portion of the tank, and near the bottom, is a bar, E, whose length is at right angles to the length of the apparatus, and consequently at right angles to the length of the flexible material, which, when duly coated with composition material, constitutes the flexible roofing. This bar E is of a suitable shape in cross-section, and operates as a rubber or scraper, as will be more fully hereinafter specified. Preferably it is rounded on the under front and rear edges, $e$, substantially as shown. At the rear upper edge are the scrapers F and G. The scraper F occupies the lower position in front of the flexible material which is to pass through the tank, and the scraper G occupies the upper position in rear of the said flexible material. The length of the scrapers is at right angles to the length of the apparatus, and consequently to the length of the flexible material. The opening edge $f$ of each of the scrapers is preferably rounded, as shown, and the operating-edge $f$ of the upper rear scraper, G, projects beyond the line of the operating-edge $f$ of the lower front scraper, F. These scrapers F and G are suitably supported, preferably, on a frame, H, in turn upheld by the frame which supports the tank A. They are also preferably made adjustable, and in the present illustrative instance the adjustability is provided for by means of slots $g$ in each scraper, the length of the slots being transverse to the length of the scraper, the scraper being held to its bed by one or more bolts passing through each slot and into the said bed. By loosening the bolts the operating-edge of the scraper may be advanced or retracted, as desired.

In connection with the apparatus for coating the flexible material is usually connected a rack for drying the flexible material after it has been coated with the roofing composition. A desirable construction of such rack is as follows: K K' K' K² represent vertical frames supported in their vertical position by braces. The latter either connect the upright frames together or extend, as shown, diagonally from their respective frames to the floor or equivalent foundation support. The inner part of the upper edge of the forward frame, K, is rabbeted or shouldered down at $m$, and the inner part of the upper edge of the rear frame, K², is rabbeted or shouldered down at m, and this is the preferred mode of securing the rack to the frames. The frames K', placed between the end frames, K and K², are of any suitable number, and are of the thickness of the rack shorter than the end frames. The rack M is placed upon the frames, the forward end of the rack fitting into the rabbet m in frame K, and the rear end of the rack fitting into the rabbet in the frame K², the middle portion of the rack resting on the frames K'.

Any suitable means for operating the flexible material and of drawing it through the tank of composition and then drawing the material thus coated upon the rack may be employed; but I prefer the following means: At the rear end of the rack is a roller, N, journaled in bearings in the rear frame, K², the upper part of the periphery of the roller preferably being above the upper surface of the rack, and the lower part of the periphery of the roller being below the lower surface of the rack. Between the uprights C is journaled the roller P, and this roller is operated by hand or by other power. Ordinarily it will be operated by hand through the medium of a crank, Q, attached to the shaft P' of the roller.

The preferred means for grasping the free end of the coated flexible material as it comes from the tank consists in an iron rod or stick, R, wider than the flexible material to be operated upon. At or near each end of this rod is attached a cord or strap, S, the points of attachment of these cords S being preferably farther apart than the width of the said flexible material. Each strap is connected to a suitable gripper, T, and the preferred mode of making the connections between the rod R and the gripper consists in passing the strap through an opening, n, in the rod, and through the loops or eyes in the handles of the members p p of the automatic gripper.

The members of the gripper are pivoted together after the manner of a pair of shears or ice-tongs. The inner side of the forward end of one member, p, of the gripper is provided with a groove, r, and the inner side of the forward end of the other member of the gripper is provided with a bead, t, of a size to fit into said groove. To the rod or stick is connected the main draft rope or cable V, the connection between this cable V and the rod R being preferably made by means of cords or links X, attached or hooked together to the free end of the cable, and the other end of one of said cords or links being connected to the rod V at or near one end of the latter, and the other of said cords or links being connected to the rod or stick V at or near the other end of the latter. Before being wound up, the rope or chain V extends from cords X or rod R back over the rack, around roller N, and thence below extends forward to the roller P, to which it is suitably connected and upon which it is wound.

The mode in which the various portions of my improved apparatus are operated is as follows: The tank A is filled with a suitable liquid or semi-liquid roofing composition or paint. The flexible material is of any textile material, fibrous or metallic, or glass, or the like, the preferred material being canvas. This flexible material is introduced into the tank by being drawn over the upper front edge of the latter, then is passed down into the tank and carried under the rubber or scraper E from front to rear of the tank A. It is then carried up the rear side of the tank and passed between the scrapers F and G, passing against the rear edge of scraper F and the forward edge of scraper G. It (the flexible material) is then ready to be drawn through the tank and to be laid upon the rack. The grippers T are now attached to the free end of the flexible material W, one gripper being attached to the said free end at or near one outer side, and the other gripper being attached to the said free end at or near the other outer side edge of said flexible material. The roller P is now rotated, and the cable V is wound up thereon. As the rotation of the roller P winds up the cable V the flexible material W is drawn forward over the front end of the tank down through the roofing composition, thence under the rubber or scraper E; thence at the rear side of the tank, up through the roofing composition, against the operating-edges f of the scrapers F and G; thence forward over the top of rack M; thence around the roller at rear end of the rack; thence forward under the rack to the front end of the latter. During the passage of the flexible material down through the composition it becomes thoroughly soaked and impregnated with the roofing composition. As it passes under the bottom rubber, E, the latter removes from the flexible material all of the surplus composition, and also rubs the composition through the meshes and into the meshes of the canvas, thus thoroughly impregnating the heart or center of the meshes of the canvas with the composition. The flexible material, after leaving the rubber E, passes up through the composition and takes a new supply of the composition upon its surface. It then passes against the operating-edge f of the scraper F, and this scraper removes a portion, but not all, of the surplus composition which lies on that (the adjacent) side y of the flexible material and which side is the upper side of the material, when the latter is used for roofing purposes. It then meets the edge f of the upper scraper, G. The scraper G is preferably adjusted at an angle, substantially as shown, for the purpose of removing all of the surplus composition from that (the adjacent) side y' of the flexible material, and of returning the said surplus composition back into the tank, and thus saving all waste of composition. The flexible material thus coated is drawn upon the rack in the manner aforementioned—that is to say, upon the rack and underneath the rack; but, when preferred, and where economy of room is not an object, the flexible material may lie on the upper side only of the rack. In either case, whether the flexible coated material is upon the top of the rack or both above and below the rack, the flexible coated material is secured to the rack, and the rack is then lifted off and placed in proper position for the coated material to be dried. A new rack is now placed upon the frames or standards K K′ K², and this rack is in like manner covered by freshly-coated material, after which this rack can be removed, and this substitution of racks may be repeated, as desired.

For convenience of rolling up this roofing material and of shipping it, as well as for other advantageous reasons, I provide a roller of a peculiar construction, viz: The roller J is suitably journaled. In the side of the periphery of the roller, and running lengthwise therewith, is a recess, $l'$, which receives a rod or slat, $l$, which, when in position in the roller, projects in cross-section beyond the periphery of the roller. The finished flexible coated roofing material is wound onto this roller. The roller is now removed from its journal-bearings, and rod or slat $l$ is then removed, being slipped out lengthwise. The roller is thus reduced in size, and can be withdrawn from the roll of roofing material and then replaced in its journal-bearings, and the rod or slat being then replaced in the roller, the latter is in readiness to receive and have rolled upon it another length of the finished roofing material. The withdrawal of the roller J from the roll of roofing material is a positive benefit to the said roll, as the latter is not only rendered lighter, but it is open to ventilation, and air can enter and assist in drying the material located in the inner portion of the roll. The preferred location of this roller J is between the uprights C C, the journals of the roller resting in bearings 2, located in the said uprights. A preferred form of bearing 2 is that shown, and consists in leaving the same open above and approached by guideways 3. Thus the roller can be readily placed in its bearings or removed therefrom. When the roller J is located between the uprights C, and the flexible material is to be wound thereon, the rack containing the flexible coated material now dried is to be replaced on the vertical frames or standards K K′ K², and the flexible material then wound onto the roller J and off from the said rack.

It is obvious that the combination of the roller P and roller J with uprights C C, which latter are preferably employed, as shown, as a part of the frame-work supporting the tank A, affords great compactness of arrangement, facility in operation, and economy of room.

The adjustability of the scrapers F and G enables their operating-edges to be advanced and retracted, and thus the amount of surface composition coating to be left on each side of the flexible material can be regulated at pleasure. By advancing scraper F more of the coating on the upper side of the flexible material will be removed. By advancing the scraper G further toward or over scraper F more of the coating on the under side of the flexible material will be removed. Obviously retracting one of the scrapers will cause it to press less against the flexible material, and hence less of the surface coating of composition will be removed.

It will be observed that the formation of each gripper is such that the harder the flexible material is pulled the more tightly the grippers grasp the latter.

While the various features of my invention are preferably employed together, one or more of said features may be employed without the remainder, and, when desired, one or more of said features may be employed, so far as applicable, in connection with devices of descriptions other than those herein specifically described.

What I claim as new and of my invention, and desire to secure by Letters Patent, is—

1. The tank A, provided with forward upper rounded edge, $b$, the tank having its forward and rear sides inclining inward toward its bottom, and having near its bottom the stationary rubber E, and at or near its rear upper edge the scrapers F and G, between which the flexible material coming from the tank is passed, substantially as and for the purposes specified.

2. The tank A, provided with forward upper rounded edge, $b$, the tank having its forward and rear sides inclining inward toward its bottom, and waste-hole $z$, provided with device for controlling the discharge through said hole, substantially as and for the purposes specified.

3. The combination of the tank A and the transverse rubber E, having its lower edges formed substantially as described, and located near the bottom of said tank, and the scrapers F and G, the scraper F being the lower and forward scraper, and having operating-edge $f$, and the scraper G being the upper and rearward scraper, and having operating-edge $f$, lying above and projecting over the operating-edge of scraper F, and inclined upward at an angle to the horizontal, substantially as and for the purposes specified.

4. The combination of the tank for holding composition, and the rubber E, located near the bottom thereof, and the adjustable scrapers F and G, substantially as and for the purposes specified.

5. The combination of the tank A, having near its bottom the transverse rubber E, having its lower edge formed substantially as described, and located near the bottom of said tank, and the scrapers F and G, the scraper F being the lower and forward scraper, and having operating-edge $f$, and the scraper G being the upper and rearward scraper, and having operating-edge $f$, lying above and projecting over the operating-edge of scraper F, and inclined upward at an angle to the horizontal, one or both of the scrapers being provided with means, substantially as described, for enabling them to be adjusted transversely to their length, substantially as and for the purposes specified.

6. The combination of the tank A, having near its bottom the transverse rubber E, having its lower edges formed substantially as described, and located near the bottom of said tank, and the scrapers F and G, the scraper F being the lower and forward scraper, and having operating-edge $f$, and the scraper G being the upper and rearward scraper, and having operating-edge $f$, lying above and projecting over the operating-edge of scraper F, and inclined upward at an angle to the horizontal, one or both of the scrapers being provided with the slots $g$, substantially as and for the purposes specified.

7. The movable adjustable drying-rack, in combination with the standards and the stationary composition-tank, substantially as and for the purposes specified.

8. The movable adjustable drying-rack, in combination with the vertical frames or standards, the end standards provided with the rabbets or recesses $m$, substantially as and for the purposes specified.

9. The combination of the tank for holding composition, rack, standards, roller J, and roller P, and cable V, substantially as and for the purposes specified.

10. The combination of the tank for holding composition, rack, standards, roller J, and roller P, cable, rod R, and grippers, substantially as and for the purposes specified.

11. The combination of the cable, rod R, cords or straps S, and the grippers, one member or jaw of each being provided with bead $t$, and the other member being provided with groove $r$, the bead and groove being arranged transversely to the length of the grippers, substantially as and for the purposes specified.

12. The combination of the tank, scraping devices, rack, roller J, standards, uprights C C, forming part of the supporting-frame of the tank, and roller P, located in said uprights, substantially as and for the purposes specified.

13. The combination of roller J, provided with recess 2, and stick or piece 3, substantially as and for the purposes specified.

14. In an apparatus for making flexible coated roofing, the combination of the uprights C C and roller P and roller J, the said uprights supporting said rollers, substantially as and for the purposes specified.

15. In an apparatus for making flexible coated roofing, the combination of the uprights C C and roller P and roller J, the said uprights supporting said rollers, and the removable adjustable rack, substantially as and for the purposes specified.

16. In an apparatus for making flexible coated roofing, the combination of the uprights C C and roller P and roller J, the uprights forming a portion of the support of the tank for holding the composition and upholding said rollers and the rack, substantially as and for the purposes specified.

17. In combination with the rack and roller J, the uprights provided with open journal-bearings having guideways 3, substantially as and for the purposes specified.

L. LEWIS SAGENDORPH.

Attest:
   JNO. W. STREHLI,
   O. M. HILL.